April 30, 1935.    W. F. MacGREGOR    1,999,841
POWER TAKE-OFF SHAFT
Filed Aug. 29, 1932    2 Sheets-Sheet 1
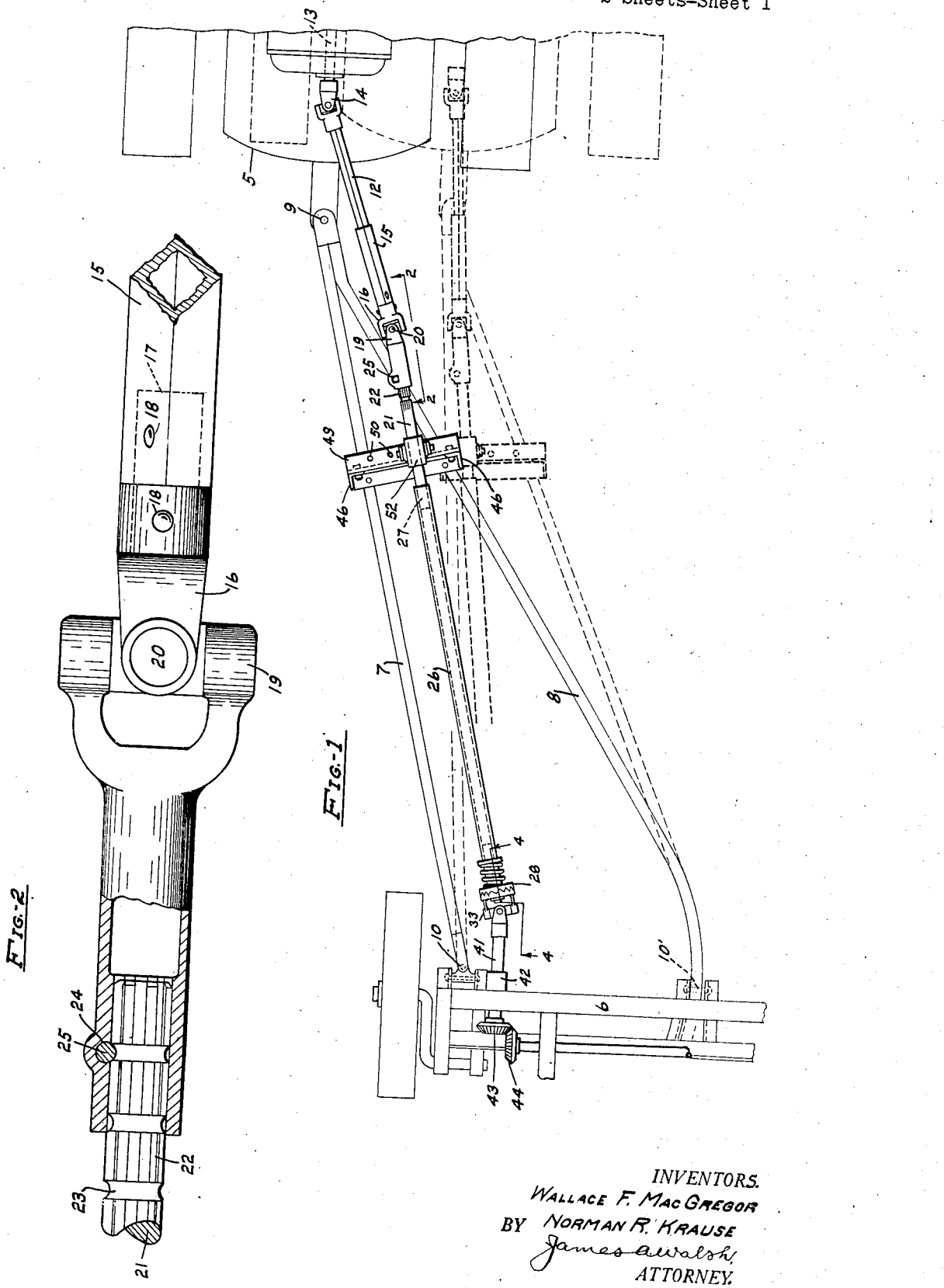
INVENTORS.
WALLACE F. MacGREGOR
BY NORMAN R. KRAUSE
James A. Walsh
ATTORNEY.

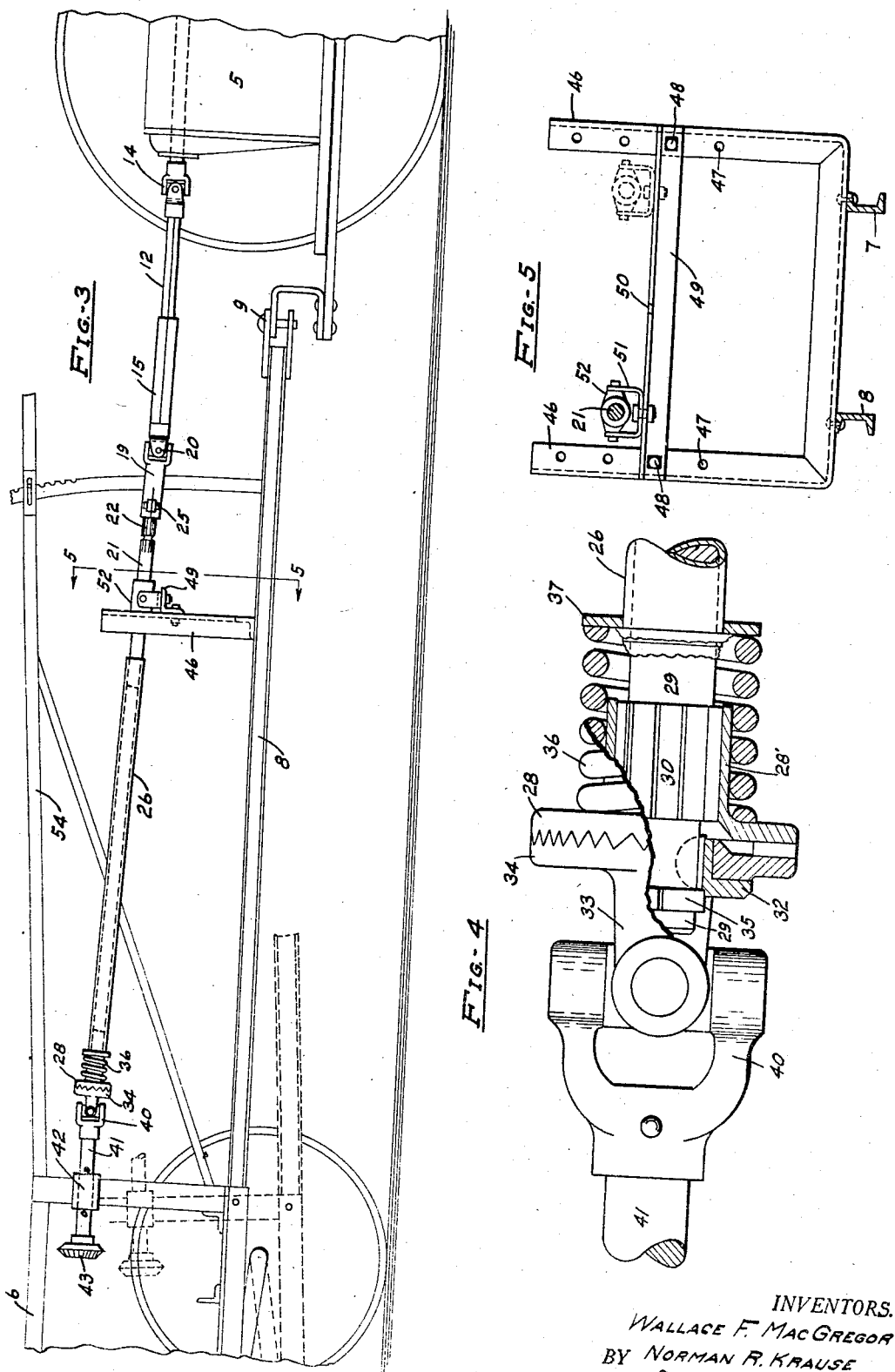

Patented Apr. 30, 1935

1,999,841

UNITED STATES PATENT OFFICE 1,999,841

POWER TAKE-OFF SHAFT

Wallace F. MacGregor and Norman R. Krause, Racine, Wis., assignors to J. I. Case Company, Racine, Wis., a corporation Application August 29, 1932, Serial No. 630,820

6 Claims. (Cl. 180—14)

Our invention relates to power take-off shafts for various purposes, and particularly for use in connection with tractors for operating moving agricultural machines, such as harvesters and the like, said shaft being so flexibly assembled as to be self-adjusting to follow ground irregularities traversed by a tractor and machine or implement, as will more fully appear.

In the accompanying drawings, forming part hereof, Figure 1 is a plan view of a tractor and a corn harvesting machine, in fragment, connected by a drawbar and equipped with our improved power shaft; Fig. 2, an enlarged detail of a portion of the forward section of the shaft and its telescoping connection, taken on the dotted line 2—2 in Fig. 1; Fig. 3, a side elevation showing the relation of the power shaft to the machine when the latter is adjusted from the position shown in full lines to that indicated in dotted lines; Fig. 4, a detail of a portion of the power shaft which includes a clutch, as seen when looking in the direction indicated by the arrows 4—4 in Fig. 1; and Fig. 5 is an elevation of an adjustable frame mounted on the drawbar for supporting the power shaft, as seen when looking in the direction indicated by the arrows 5—5 in Fig. 3.

In said drawings the numeral 5 indicates a tractor, 6 a corn harvester, and 7, 8, a drawbar pivotally connected, at 9, to the tractor, and its opposite end so connected to the harvester, at 10, 10', as to be vertically and laterally adjustable, but it will be understood that our improved power shaft may be employed with any suitable drawbar or connecting support between said vehicles.

The power shaft comprises a section 12 connected to the power take-off shaft 13 of a tractor by a universal coupling 14, said section being preferably square and telescoping into a similar section 15 forming part of a yoke 16 and in which it is secured by a stub-shaft 17 by screws 18 or otherwise. To the yoke 16 a clamping yoke 19 is connected by pins 20 to form a universal coupling, the clamping yoke being adapted to receive a shaft section 21 having a splined end 22, which splined portion embodies circumferential grooves 23 adapted to register with a hole 24 formed through the yoke so that when shaft 21 is adjusted longitudinally in relation to said yoke the two elements may be fixedly secured by a bolt or pin 25 passing transversely through the yoke, as clearly shown at 25 in Fig. 2.

The section 21 forms part of the main shaft 26, preferably made of tubing, in which the section 21 is welded, as at 27, or otherwise, the opposite end of said main shaft being provided with a yielding clutch member 28 having a sleeve 28' mounted on shaft 29 which is splined, at 30, and welded in the hollow shaft 26, the assemblage described producing a main shaft of light and durable character for our purpose. A bearing 32 is keyed to shaft 29, Fig. 4, and upon which bearing we mount a yoke 33 having a clutch member 34 engaging clutch 28, said clutch members being held in engagement on shaft 29 by means of a split ring 35 and the spring 36, which latter abuts clutch 28 and a washer 37, or equivalent stop, secured on shaft 26. The yoke 33 is pivotally connected to a yoke 40 secured to shaft section 41 mounted in a bracket 42, Fig. 3, and provided at its opposite end with a bevel gear 43 engaging a driven gear 44 on the harvester for operating actuating parts thereof.

As a power line of the character disclosed is of considerable length we provide therefor a supporting frame mounted on the drawbar, which comprises vertical members 46 having openings 47 therethrough for receiving fastening bolts 48 connecting an adjustable cross-member 49 to members 46, said cross-member having apertures 50 therein for supporting a bracket 51 in adjusted positions, the bracket being provided with a steady bearing 52, as indicated by full and dotted lines in Fig. 5 for a purpose to appear.

It is essential to maintain the pivotal connections 9, 14 and 20 in equidistant relation at all times, substantially as shown in Fig. 1 indicating the tractor in offset relation to the harvester, in order to compensate for any irregular movements of the drawbar and the shaft sections 12 and 21 incident to ground irregularities over which the tractor and harvester travel, and as the power shaft as a whole is subjected to constant vibrations and more or less longitudinal movements we mount the same in steady bearing 52 so that it will be in sliding relation thereto. This relation is accomplished by centering pivot 9 between couplings 14 and 20, and thus the angularity of the couplings will be equally divided so that in turning said couplings will not become locked. It will be apparent from Fig. 3, which shows the normal position of the power line in full lines, that when the harvester is rocked into downward and rearward position, indicated in dotted lines, by adjusting the frame on its axle or by manipulating a lever 54 common to all such machines, the supporting bearing 42 on the machine will be changed to the dotted line position, during which movement the shaft section 41 mounted therein will follow, so that there will be no interruption of rotation of the power shaft as the machinery is moving. It will be understood also that should the machine become clogged, or its actuating parts abruptly stopped from any cause, the shaft section 41 will cease rotation and the clutch member 28 disengaged from member 34, whereby the main shaft will continue rotation without damage to the power line, and that immediately such difficulties have been overcome clutch 28 through the force of spring 36 will become reengaged with clutch 34, and the power line thus becomes automatically readjusted into operative condition.

When it is desired to connect the vehicles for straight pulling, that is, in direct alignment with each other, the pin 25 is released from the clamping yoke 19, the bracket 51 is adjusted laterally and the drawbar disconnected at 10', whereupon the tractor may be steered inwardly so that it, the drawbar and the power line will assume the position indicated by dotted lines in Fig. 1. The purpose of employing the laterally adjustable bracket 51 is to provide means for equally dividing the operating angle of the series of universal couplings, and which adjustability also accommodates the alignment of the power shaft with different types of tractors having power shaft connections at either the right or left sides of the center of the tractor. In such latter position the drawbar is reconnected at 10', the clamping yoke 19 which has moved rearwardly along splined shaft 21 is again tightened by pin 25, and the bracket is secured to the cross-member 49, in the appropriate position. It will be understood that the location of the power take-off shaft 13 varies in different types of tractors, some being higher and others mounted in one side of the tractor, for which reason we provide the vertical members 46 and cross-member 49 with adjustable means for accommodating power take-off shafts positioned at various heights or otherwise in different tractors. When adjusted in the manner described it will be seen that the shaft section 12 has not telescoped into section 15 due to the changes in position of the power shaft as the variations in its total length are compensated for by the telescoping of yoke 19 on the spline 21, and in becoming so adjusted the pivotal connections 9, 14 and 20 continue in equidistant relationship without any interference of freedom of action of said parts during the frequent irregular land conditions encountered in field operations or the turning of the vehicles. It will be understood, of course, that when the drawbar 7, 8, is laterally adjusted to intermediate or farther positions than indicated in Fig. 1 the power line, when the bracket 51 is released and the pin 25 disengaged as before described, will follow the movements of the drawbar, the pivotal connections between the parts referred to will assume proper relationship at all times, and there will be no interference with their free action to permit vibration and irregular movements of said flexible power shaft. The principal object in maintaining the equidistant relation between the connecting points 9, 14 and 20 is to divide the angles so that when the tractor is turning the angularity of the universal joints will be equally divided and they will not become unduly stressed or locked against rotation during such movements of the tractor.

We claim as our invention:

1. The combination, with a machine and a power plant having a power take-off shaft, of a shaft section having telescoping members pivotally connected to the power take-off shaft, a yoke forming part of one of said telescoping shaft members, a clamping yoke connected to said yoke, a shaft section mounted in said clamping yoke its opposite end engaging the machine, and means for releasing the clamping yoke whereby as said shaft sections are adjusted laterally the clamping yoke will telescope on the section engaging the machine so that the shaft will be increased or decreased in length according to the distance between the power plant and machine as the shaft is being laterally adjusted.

2. In a power take off, a shaft section, means for pivotally connecting the section to a tractor, a second shaft section in which the first mentioned section telescopes and having a yoke at its rear end, a clamping yoke connected to said yoke, a main shaft section comprising a tubular member and a forward section secured thereto and engaged by the clamping yoke said tubular member having a stop thereon, a splined shaft secured in the tubular section, a clutch member having a sleeve mounted on the splined shaft and adjustable longitudinally thereon, a controlling spring between the stop and the clutch member, a bearing on the splined shaft, a clutch member on the bearing in rear of and engaging the first mentioned clutch member, a keeper on the splined shaft for normally maintaining the clutch members in engaged relation, a yoke pivotally connected to the rear clutch member, and a shaft section connected to the yoke and engaging actuating mechanisms on a machine.

3. The combination, with a machine and a tractor having a power take-off shaft, of a drawbar pivotally connected to the tractor; a frame on the drawbar embodying a vertically adjustable support; a bearing on the support and adjustable laterally thereon; and a power shaft connecting the tractor and machine comprising a telescoping section, a clamping yoke pivotally connected thereto, a main shaft mounted in the clamping yoke and slidably supported in said bearing, a clutch interposed in said main shaft, and a shaft section pivotally connected to the clutch and engaging mechanism on the machine for controlling the same.

4. The combination, with a machine and a tractor having a power take-off shaft, of means for connecting said elements, shaft supporting means on said connecting means, a main shaft laterally adjustable and longitudinally slidable on said support, a telescoping shaft section connected to the power take-off shaft, means for clamping the telescoping section to the main shaft section for maintaining said sections in fixed longitudinal relation when the shaft as a whole is in predetermined position, and means for releasing the clamping means whereby the main shaft section will telescope into the clamping means for shortening the shaft as a whole when adjusted laterally from its predetermined position.

5. The combination, with a tractor and a machine embodying actuating mechanisms drawn and operated by the tractor, of a drawbar, a support on the drawbar embodying vertical members and a cross-member adjustable thereon, a bearing adjustable on the cross-member, a sectional universally coupled power shaft mounted in the bearing and connected to the tractor and to the machine said shaft including a main section and members adapted to telescope in relation to each other for increasing and decreasing the length of the power shaft, releasable means on the main shaft section connected to the telescoping section whereby the latter may telescope on the main section, and means interposed in the main shaft section whereby when the operation of the machine ceases that portion of the power shaft engaging the actuating mechanisms of the machine will stop rotating while the remainder of the power shaft rotates.

6. The combination, with a machine and a power plant having a power take-off shaft, of a shaft section having telescoping members pivotally connected to the power take-off shaft, a yoke forming part of one of said telescoping shaft sections, a clamping yoke having an opening therein and connected to said yoke, a shaft section having a circumferential groove therein mounted in said clamping yoke its opposite end engaging the machine, and means insertible in the clamping yoke opening and the groove in the shaft section for securing the yoke and shaft and also for releasing said clamping yoke whereby as said shaft sections are adjusted laterally said clamping yoke will telescope on the section engaging the machine so that the shaft will be increased or decreased in length according to the distance between the power plant and machine as the shaft is being laterally adjusted.

WALLACE F. MacGREGOR.
NORMAN R. KRAUSE.